Figure 1:
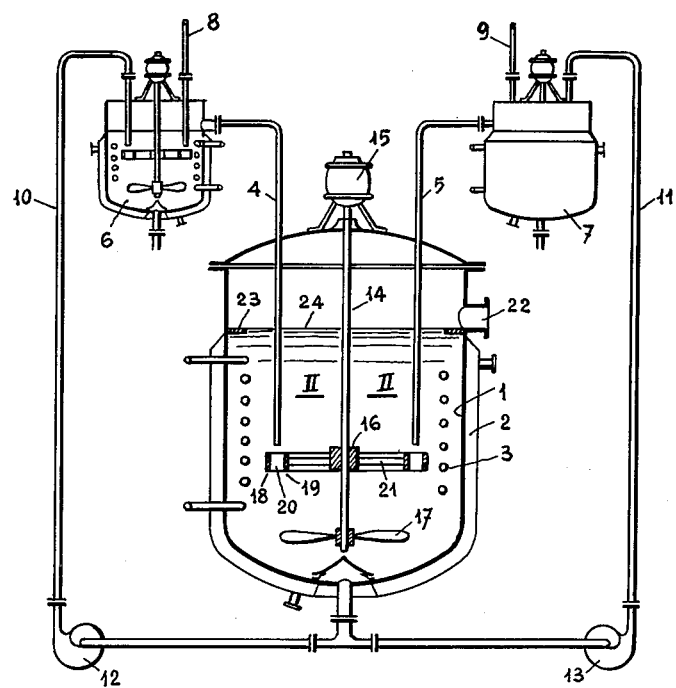

April 3, 1962

M. BALLESTRA 3,028,227

APPARATUS FOR CONTINUOUSLY EFFECTING SULPHONATION, NITRATION, AND LIKE STRONGLY-EXOTHERMIC REACTIONS

Filed April 22, 1957

2 Sheets-Sheet 1

April 3, 1962

M. BALLESTRA 3,028,227

APPARATUS FOR CONTINUOUSLY EFFECTING
SULPHONATION, NITRATION, AND LIKE
STRONGLY-EXOTHERMIC REACTIONS

Filed April 22, 1957

2 Sheets-Sheet 2

3,028,227
APPARATUS FOR CONTINUOUSLY EFFECTING
  SULPHONATION, NITRATION, AND LIKE
  STRONGLY-EXOTHERMIC REACTIONS
Mario Ballestra, Via XX Settembre 40/8, Genoa, Italy
        Filed Apr. 22, 1957, Ser. No. 654,302
    Claims priority, application Italy Sept. 4, 1956
              4 Claims. (Cl. 23—285)

This invention relates to a method and an apparatus for effecting exothermic reactions in continuous manner such as, but not exclusively, nitration and sulfonation, the latter reaction being effected for instance in connection with the synthetic detergent industry.

In the following description reference will be made only to sulfonation processes, but it is to be understood that the method according to the invention and the apparatus can be employed for other reactions.

In the known method and apparatus for effecting exothermic reactions, a high heat of reaction is combined with a very high reaction speed, causing local overheating and, owing to uncontrollable reactions, a darkening of the product, a formation of undesirable products like, in the case of sulfonation, of disulfonates.

In heretofore known apparatus gaseous sulfuric anhydride diluted into a great mass of air is used; the gas mixture is caused to bubble into the apparatus in order to increase the reaction time and the possibility of cooling and controlling the reaction. However it is necessary to release an amount of heat greater than that produced by the reaction, since the condensation heat of the gaseous sulfuric anhydride must also be taken into consideration. As a result, the apparatus assemblies are complicated and it is necessary to recover the sulfuric anhydride entrained by the air coming out of the reaction apparatus.

The method according to the present invention finds many applications; for example it may be employed for the sulfonation, either with sulfur anhydride, which may be used either in a gaseous state or in a liquid state, or with oleum, of organic substances such as for example alkylated hydrocarbons, phenols, acids and aliphatic alcohols in the synthetic detergent industry, in the manufacture of emulsifying agents and so on. The process may also be used in organic syntheses such as the manufacture of dyes, detergents and so on, and in nitrations particularly of organic substances, for the manufacture of explosives, dyes and so on. The process may also be used in the exothermic neutralization of acid substances with bases, either liquid or gaseous, and in the exothermic dilution of substances.

The method for continuously carrying out exothermic reactions such as, but not exclusively, sulfonations, nitrations and the like according to the invention, is characterized by the fact that at least one reagent, before being added to the main body of the reaction mass, is premixed with a portion of the reaction mass, thereby achieving a diminution of the development of the heat of reaction.

The apparatus for the carrying out of the method is characterized by the fact that the reactor is provided with a prediluter for at least one reagent with a closed cycle path including the prediluter, one end of the path being within the reactor and corresponding with the point of arrival of the premixed reagent, and the other end being in an area from which a part of the product reaction mass that has already reacted is taken away, the closed cycle path being provided with circulation means.

The apparatus is further characterized by the fact that in the interior of the reactor there is provided a dispersing device for the reagent which reaches it already premixed with a part of the product reaction mass that has already reacted.

In a preferred embodiment, the dispersing device is characterized by the fact that the dispersing device is in the form of a blade impeller, the impeller arms also being preferably blade-shaped.

In said embodiment the apparatus is characterized by the fact that a stirring device cooperating with the dispersing device in stirring the mass is provided in the interior of the reactor and beneath the dispersing device.

The apparatus is further characterized by a condenser coil arranged to work as a guide for the rotary motion to which the mass is submitted within the reactor.

The apparatus is also characterized by the fact that the reactor is provided with a ring or equivalent device in order to insure, notwithstanding the strong stirring action upon the mass within the reactor, that the mass has its upper level surface flat or slightly swelled, but regularly formed, so that it can cooperate with the overflow pipe.

In a preferred embodiment, suitable for some applications, the apparatus is characterized by the fact that every part of it is contained in a single assembly, including two independent dispersing devices for the two reagents, at least one stirring device cooperating with one of the two dispersing devices to effect the quick dilution of the reagent premixed with the mass to be treated, at least one premixer for mixing liquid reagent with a gas fed by a fan, a stirring device, a cooling coil and a recovery chamber for the dilution gas which is sent again into the cycle by the fan, and a guide wall for guiding the liquid mass under the action of the dilution gas and of the stirring device.

In embodying the apparatus other elements, according to the particular reaction to be carried out, can be employed, such as a conduit leading from the dilution area of the reagent/gas mixture to the dispersing device, and the apparatus can also be provided with an ejector outlet means or with a suction fan, or both.

Figure 2:
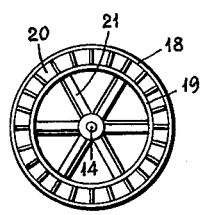
Figure 3:
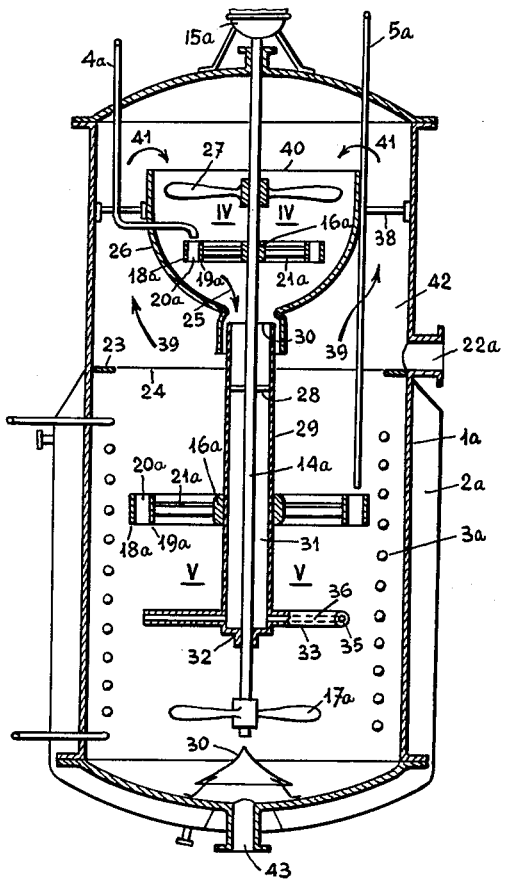
Figure 4:
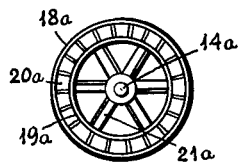
Figure 5:
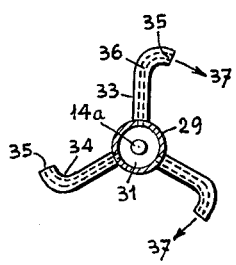

In the annexed drawings, two preferred embodiments of the apparatus according to the invention for two cases of practical application are shown by way of example; FIG. 1 is a schematic, axial and vertical section of a first embodiment, and FIG. 2 is a partial plan section according to the line II—II of FIG. 1; FIG. 3 is a view similar to FIG. 1 of another embodiment and FIGS. 4 and 5 are partial plan sections according to lines IV—IV and V—V, respectively, of FIG. 3.

With particular reference to FIG. 1 which relates to the case in which the reaction takes place between two proportioned liquid reagents, the vessel I is conveniently surrounded by the cooling jacket 2 and contains a cooling coil and guide 3, the conduits 4 and 5 leading from the premixers 6 and 7 which are fed from pipes 8 and 9 with the two proportioned reagents and which are fed by the conduits 10 and 11 from the pumps 12 and 13 by a part of the reaction mass contained in the vessel I. Coaxially to the vessel I is the shaft 14 driven by the motor 15 and carrying the dispersing device 16 and, below, the stirring device 17. The dispersing device 16 is formed by a double annular band 18 and 19 carrying the inclined blades 20, all being carried by radial elements 21 which are also inclined in a manner to further contribute to the desired action of the dispersing device. Inside the vessel, right under the outlet 22 for the overflow (which can be either restrained or annular) a ring 23 which extends from the wall of vessel I is provided. Each premixer is formed in like manner, analogous to that of the reactor. However some elements can be omitted. For this reason the specific construction of the premixers 6 and 7 is not described but can be seen in the drawing.

The apparatus operates in the following manner: the mass to be treated enters the vessel I at a height corresponding to that of the overflow pipe 22; the two regulated liquid reagents reach, by way of the conduits 8 and 9, the premixers 6 and 7 which are simultaneously fed by the pumps 12 and 13 and the conduits 10 and 11 with a part of the treated mass. The same operation that is now going to be described for the reactor I, will also take place is each of the two premixers 6 and 7. The mixture of each of the reagents, which come from 8 and 9 with a part of the mass contained inside the reactor I, will arrive by way of the conduits 4 and 5 and the blades 20 of the dispersing device 16 will cause a strong dispersion of said mixture into the mass. Simultaneously the stirring device 17 will cause a strong agitation of the contents of the reactor I; notwithstanding this, the ring 23 will actuate a level surface 24 which substantially flat, or slightly swelled, but regular, which will allow a regular discharge of the treated mass from the overflow pipe 22; the coil 23 also serves, owing to its disposition, as a guide for the rotatory and stirring motion of the mass within the apparatus.

By using the apparatus just described it is possible to obtain the aforeindicated advantages.

With reference to FIGS. 3 to 5 which relate to the case in which one of the reagents is a mixture of a liquid and a gas and the other is a liquid, wherein the same reference numerals have been used for parts corresponding to those of FIGS. 1 and 2, with an *a* added the two premixers indicated in FIG. 1 by 6 and 7 have been provided inside the reactor I; but in FIG. 3 there are two dispersing devices 16, 18, 19 and 20 which are conveniently referred to as upper and lower dispersing devices according to their position inside the reactor.

One of the reagents coming through the conduit 5a reaches the lower dispersing device 16a, 18a, 19a, 20a, 21a which is constructed as in the embodiment according to FIG. 1. The other reagent arrives through the conduit 4a and upon the blades 20a of the upper dispersing device and moves downwardly in the direction of the arrow 25 through the lower orifice of a stationary cup 26 coaxial with the shaft 14a, also containing a fan 27 whose purpose will be described below, the cup being supported by the holders 38 from the sides of reactor 1a. To the shaft 14, by means of the holders 28, is connected a tubular element 29 coaxial with the shaft 14a and having at its upper end an orifice 30 disposed in the lower orifice of the cup 26. On the element 29, rotating with the shaft 14a, is mounted the lower dispersing device 16a, 18a, 19a, 20a, 21a. The gap 31 between the tubular element 29 and the shaft 14a is closed at the bottom at 32. Just above the bottom, arms 33 are provided on the element 29 and they project in a direction perpendicular to the apparatus axis, and are then curved in 34 at such a way that the conduits 36 contained in the arms 33 and joining the gap 31 with the orifices at extremities 35 of said conduits, cause the jets issuing from the orifice in the direction of the arrow 37 to move in a tangential direction with a circumference concentric to the shaft 14.

The operation of the device according to FIGS. 3 to 5 is as follows:

Referring to the reagent coming along the conduit 5a, there prevail the same conditions as in the apparatus according to FIG. 1, since the lower dispersing device 16a, 18a, 19a, 20a, 21a acts not only as a dispersing device, but also as a diluter of the reagent in the reaction mass, as soon as the reagent comes out of the conduit 5a and before it contacts the other part of the mass.

The reagent coming along the conduit 4a will be dispersed by the upper dispersing device 16a, 19a and 20a into the gas contained within the cup 26, and will be pushed by the fan 27 in the direction of the arrow 25 and it will move downwardly through the gap 31, then through the conduit 36, coming out in the direction of the arrows 37; the stirring device 17a works like the stirring device in the embodiment according to FIG. 1; the ring 23 (FIG. 3) also operates like the ring 23 (FIG. 1); the outlet direction of the mixture from the conduit 36 is preferably opposite to the direction of rotation of the lower dispersing device, thus producing an ejection effect which, together with the centrifugal force caused by the rotation of the conduit, contributes to the suction in the direction of the arrow 25.

One of the two reagents is in this case a mixture or suspension of a liquid and a gas; inside the reactor 1a will take place a development of gas which will concentrate in the upper chamber 42 and will be sucked by the fan 27 in the direction of the arrows 39 and will be forced into the upper border 40 of the cup 26 carried by the holders 38 connected to the vessel 1a, in such a way that it will flow in the direction of the arrow 41 and will be thus sent again into the cycle. The material, as soon as it is treated, will overflow from the outlet 22a; 43 is an outlet provided with an interception device for the emptying from time to time of the apparatus, a moulded surface 30 serving as a guide for the mass motion imposed by the stirring device 17a.

With this apparatus, according to FIGS. 3 to 5, in addition to the general aforeindicated advantages, it is possible to realize a compact construction, a relatively small apparatus size and, what is more, the recovery of the gases inside the apparatus, bringing them again into cycle.

Although for descriptive reasons this invention has been described with particular reference to the embodiments shown in the annexed drawings, many modifications can be carried out in the embodiments of the invention, in order to adapt them to different factors which may arise according to particular applications, and particularities like the guide surface 30 (FIG. 3) of one embodiment can be incorporated in another embodiment (such as the reactor and/or the premixers of FIG. 1); said modifications and variations are comprised within the scope of the invention as defined in the following claims.

What I claim is:

1. An apparatus for continuously effecting sulphonation, nitration and like strongly exothermic reactions between two reagents including a gaseous reagent and which tend to form reaction vapors and controlling the speed of said reactions which comprises, in combination, a primary reaction vessel adapted to contain the reaction product and having an outlet for the reaction product, first premixing means within said vessel for mixing a first reagent with a portion of said reaction product, second premixing means within said vessel for premixing a second reagent with a separate and different portion of said reaction product, said first and said second premixing means each including dispersing means for intimately dispersing each reagent in said separate portion of said reaction product prior to bringing the reagents into contact with each other, and said reaction vessel being provided with dispersing means for dispersing at least one of said premixed reagent and reaction product in the main body of the reaction product in said reaction vessel, said first premixing means including an inlet for said first reagent, said second premixing means including an inlet for said second reagent, and means for bringing a portion of said reaction product into contact with each reagent by means of said premixing means, said second premixing means being defined by a premixing chamber disposed above the liquid level in the reaction vessel, said second premixing means being open at the upper portion, and being provided with a fan to draw gaseous reagent and any vapors present into it, whereby each of said reagents is mixed with a portion of said reaction product prior to contact of the reagents with each other.

2. An apparatus as defined in claim 1, wherein said vessel is provided with means defining a liquid level and said first premixing means is disposed above said level and comprises a fan wheel composed of concentric rings and spokes with inclined blades being disposed between the rings, and a propeller agitator axially spaced from said wheel, and wherein said second premixing means is disposed below said first premixing zone below said liquid level and comprises a fan wheel composed of concentric rings and spokes with inclined blades being disposed between the rings, and a propeller agitator axially spaced from said wheel, means being provided to introduce the reagents onto the inclined blades of said fan wheels.

3. An apparatus for continuously effecting sulphonation, nitration and like strongly exothermic reactions between two reagents and controlling the speed of said reactions which comprises, in combination, a primary reaction vessel adapted to contain the reaction product and having an outlet for the reaction product, a first premixing means for mixing a first reagent with a portion of said reaction product, a second premixing means for premixing a second reagent with a distinctly different portion of said reaction product, said first and said second premixing means each including dispersing means for intimately dispersing each reagent in a separate and distinct portion of said reaction product prior to bringing the reagents into contact with each other and being in fluid-communicating relationship with the interior of said reaction vessel, and said reaction vessel being provided with dispersing means for dispersing at least one of said premixed reagent and reaction product in the main body of the reaction product in said reaction vessel, said first premixing means including an inlet for said first reagent, said second premixing means including an inlet for said second reagent, and means being provided for bringing a different portion of said reaction product into contact with each reagent by means of said premixing means, and means for mixing said reagents after contact with said different portion of the reaction product into admixture with each other and with the main body of reaction product, whereby each of said reagents is mixed with a different portion of said reaction product prior to contact of the reagents with each other, said dispersing means comprising a fan when composed of concentric rings and spokes with inclined blades being disposed between the rings.

4. An apparatus for continuously effecting sulphonation, nitration and like strongly exothermic reactions between two reagents and controlling the speed of said reactions which comprises, in combination, a primary reaction vessel adapted to contain the reaction product and having an outlet for the reaction product, a first premixing means for mixing a first reagent with a portion of said reaction product, a second premixing means for premixing a second reagent with a distinctly different portion of said reaction product, said first and said second premixing means each including dispersing means for intimately dispersing each reagent in a separate and distinct portion of said reaction product prior to bringing the reagents into contact with each other and being in fluid-communicating relationship with the interior of said reaction vessel, and said reaction vessel being provided with dispersing means for dispersing at least one of said premixed reagent and reaction product in the main body of the reaction product in said reaction vessel, said first premixing means including an inlet for said first reagent, said second premixing means including an inlet for said second reagent, and means being provided for bringing a different portion of said reaction product into contact with each reagent by means of said premixing means, and means for mixing said reagents after contact with said different portion of the reaction product into admixture with each other and with the main body of reaction product, whereby each of said reagents is mixed with a different portion of said reaction product prior to contact of the reagents with each other, and a condenser coil disposed interiorly of said reaction vessel and positioned to be immersed in the reaction product in said vessel.

References Cited in the file of this patent
UNITED STATES PATENTS

| | | |
|---|---|---|
| 2,005,709 | Daudt et al. | June 18, 1935 |
| 2,049,032 | Weber et al. | July 28, 1936 |
| 2,232,674 | Pyzel | Feb. 18, 1941 |
| 2,743,289 | Boer et al. | Apr. 24, 1956 |
| 2,880,076 | Kircher et al. | Mar. 31, 1959 |